US012248328B2

(12) United States Patent
Yamagata

(10) Patent No.: US 12,248,328 B2
(45) Date of Patent: Mar. 11, 2025

(54) VALVE SYSTEM

(71) Applicant: AISAN KOGYO KABUSHIKI KAISHA, Obu (JP)

(72) Inventor: Masafumi Yamagata, Toyoake (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 29 days.

(21) Appl. No.: 18/468,787

(22) Filed: Sep. 18, 2023

(65) Prior Publication Data
US 2024/0118719 A1 Apr. 11, 2024

(30) Foreign Application Priority Data

Oct. 7, 2022 (JP) ................. 2022-162427

(51) Int. Cl.
G05D 16/20 (2006.01)
F02M 25/08 (2006.01)
F16K 31/02 (2006.01)
F16K 37/00 (2006.01)
G05D 7/06 (2006.01)

(52) U.S. Cl.
CPC ....... *G05D 16/202* (2013.01); *F02M 25/0836* (2013.01); *G05D 7/0623* (2013.01); *G05D 7/0652* (2013.01); *F16K 31/02* (2013.01); *F16K 37/005* (2013.01); *Y10T 137/7761* (2015.04)

(58) Field of Classification Search
CPC .. G05D 7/0652; G05D 7/0623; G05D 16/202; Y10T 137/7761; F16K 31/02; F16K 37/005; F02M 25/0836

USPC ....................................... 137/487.5
See application file for complete search history.

(56) References Cited

U.S. PATENT DOCUMENTS 5,865,205 A * 2/1999 Wilmer ............... G05D 7/0635
  73/1.16
7,918,238 B2 * 4/2011 Tanaka ..................... G01F 5/00
  700/282
8,019,481 B2 * 9/2011 Yamaguchi .......... G05D 11/132
  700/282
8,793,082 B2 * 7/2014 Ding ......................... G01F 5/00
  702/47

(Continued)

FOREIGN PATENT DOCUMENTS

JP 20100020923 A 1/2010
JP 2011185134 A 9/2011

(Continued)

Primary Examiner — William M McCalister
(74) Attorney, Agent, or Firm — CONLEY ROSE, P.C.

(57) ABSTRACT

A valve system includes a tank, a valve member, a driving device configured to move the valve member for opening and closing the tank, and a control unit. The circuit of the control unit is programmed to move the valve member in the open direction after beginning of a process, and then reverse a direction of movement of the valve member to a standby position in a valve closed state. If the first rate of pressure change in the internal pressure of the tank since the cycle began is greater than a target rate of change, the circuit determines a waiting time such that a second rate of pressure change of the internal pressure from the start to the end of the cycle is equal to the target rate of change, and then keeps the driving device in the standby position until the determined waiting time has elapsed.

6 Claims, 4 Drawing Sheets

(56) References Cited

U.S. PATENT DOCUMENTS

| | | | |
|---|---|---|---|
| 8,944,095 B2* | 2/2015 | Okabe | C23C 16/52 |
| | | | 137/486 |
| 9,400,004 B2* | 7/2016 | Monkowski | G05D 16/202 |
| 9,952,078 B2* | 4/2018 | Ding | G01F 25/17 |
| 10,012,180 B2 | 7/2018 | Kimoto et al. | |
| 10,031,004 B2* | 7/2018 | Ding | G01F 1/34 |
| 10,031,005 B2* | 7/2018 | Ding | G01F 15/046 |
| 10,126,761 B2* | 11/2018 | Johnson | G05D 7/0635 |
| 10,184,185 B2* | 1/2019 | Nakada | G01F 1/34 |
| 10,401,202 B2* | 9/2019 | Monkowski | G01F 1/34 |
| 10,534,376 B2* | 1/2020 | Nishino | G05D 7/0641 |
| 10,941,719 B2* | 3/2021 | Fukui | F02D 41/0045 |
| 2004/0112435 A1* | 6/2004 | Olander | G05D 7/0652 |
| | | | 137/487.5 |
| 2006/0278276 A1* | 12/2006 | Tanaka | G01F 25/17 |
| | | | 137/487.5 |
| 2009/0183549 A1* | 7/2009 | Monkowski | G01F 25/15 |
| | | | 73/861.52 |
| 2011/0108126 A1* | 5/2011 | Monkowski | F16K 7/14 |
| | | | 137/12 |
| 2011/0108128 A1* | 5/2011 | Kishimoto | C23C 16/45561 |
| | | | 137/12 |
| 2014/0083514 A1* | 3/2014 | Ding | G01F 15/046 |
| | | | 137/12 |
| 2014/0299206 A1* | 10/2014 | Nagase | F17D 3/00 |
| | | | 137/551 |
| 2017/0068256 A1* | 3/2017 | Nair | G05D 7/0623 |
| 2019/0071192 A1* | 3/2019 | Friederich | G05D 7/0623 |
| 2019/0332219 A1* | 10/2019 | Kong | G06F 3/047 |
| 2020/0393051 A1* | 12/2020 | Kondo | F16K 7/17 |

FOREIGN PATENT DOCUMENTS

| | | |
|---|---|---|
| JP | 2015102019 A | 6/2015 |
| JP | 2019183677 A | 10/2019 |

* cited by examiner

VALVE SYSTEM

CROSS-REFERENCE TO RELATED APPLICATIONS

This application claims priority to Japanese patent application serial number 2022-162427 filed Oct. 7, 2022, which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to valve systems.

A vehicle such as automobile including an engine is equipped with an evaporative fuel treatment system. The evaporative fuel treatment system generally has a fuel tank, a canister that absorbs fuel vapor (vapor) generated in the fuel tank and a vapor passage connecting the fuel tank and the canister. The vapor passage is equipped with a sealing valve. The sealing valve is normally closed for blocking communication between the fuel tank and the canister. The sealing valve is opened only when it is necessary to flow fuel vapor to the canister and adsorb the fuel vapor on the canister. JP-A-183677 discloses a conventional valve system. In the valve system, a stepper motor is operated to adjust the valve member opening amount based upon the flow rate estimated from the amount of change in the internal pressure of the fuel tank. By controlling the amount of change in the internal pressure, the flow rate of fuel vapor sent from the fuel tank to the canister is controlled.

In general, if the driving device (actuator) for moving the valve member is not sufficiently responsive after receiving an operation signal, it cannot be accurately controlled. In addition, when a stepper motor is used, there is a limit to finely adjust the valve member opening amount because it is necessary to provide a waiting time to prevent stalling when reversing the direction of valve member movement. Therefore, them has been a need for improved valve systems.

SUMMARY

In one aspect of the present disclosure, a valve system comprises a tank configured to store fluid, a pressure sensor configured to detect an internal pressure of the tank, a valve including a valve member and configured to open and close the tank, a driving device configured to move the valve member, and a control unit including at least one circuit. The at least one circuit is configured to move the valve member in a valve open direction after beginning of a cycle, reverse a direction of movement of the valve member and move the valve member to a standby position in a valve closed state, calculate a first rate of pressure change, which is a rate of change in the internal pressure since the cycle began, determine a waiting time such that a second rate of pressure change, which is a rate of change of the internal pressure from the start to an end of the cycle, is equal to a target rate of change if the first rate of pressure change is greater than the target rate of change, and keep the driving device in the standby position until the determined waiting time has elapsed.

DETAILED DESCRIPTION

Figure 1:
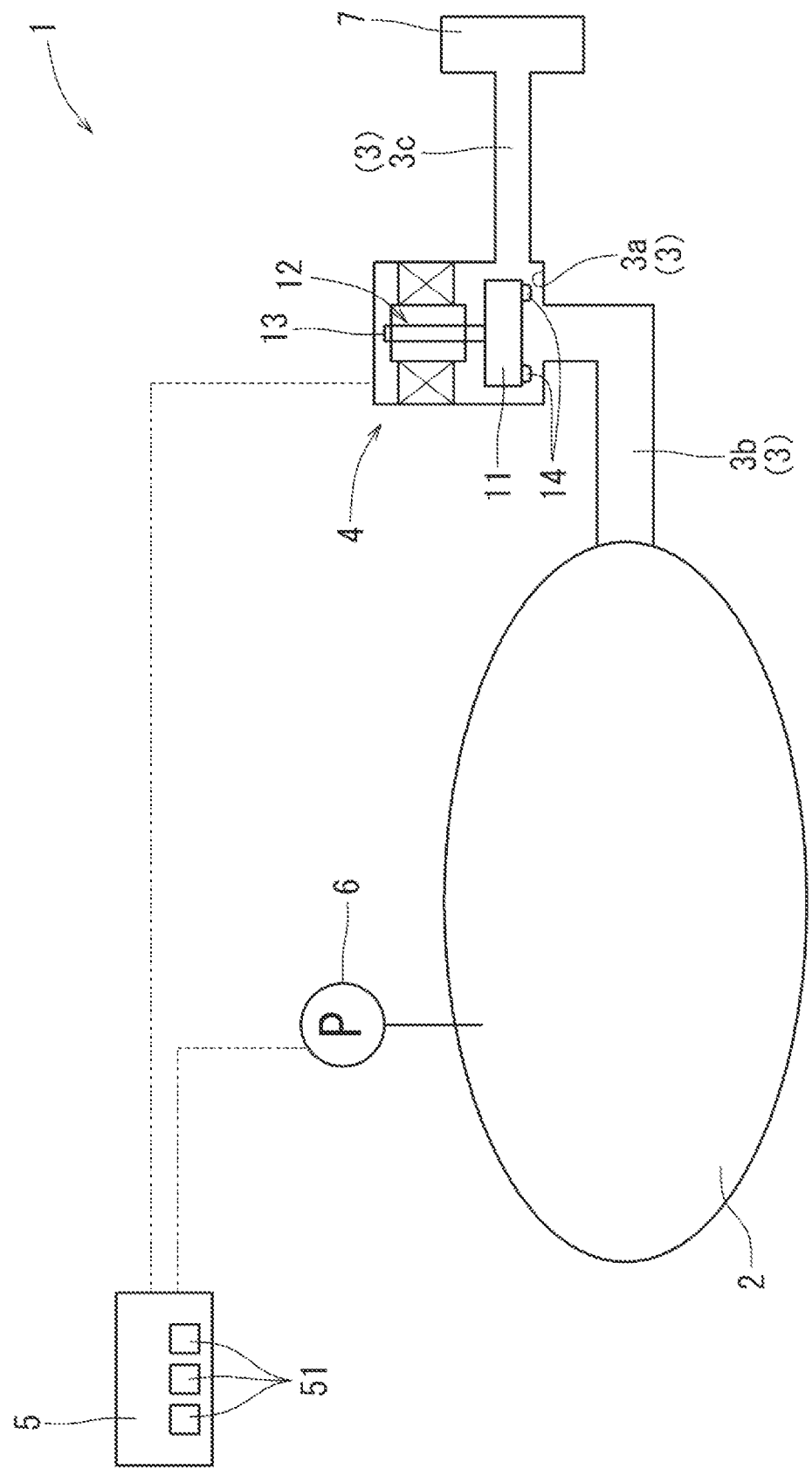
FIG. 1 is a schematic view of an embodiment of a valve system according to the principles described herein.

An embodiment of a valve system is described below based upon FIGS. 1 to 4. As shown in FIG. 1, a valve system 1 has a tank 2, a supply path 3, and a supply destination 7. The tank 2 forms a closed space for storing fluid. The supply path 3 connects the tank 2 to the supply destination 7. The fluid in the tank 2 is supplied to the supply destination 7 via the supply path 3. The valve system 1 has a valve 4 that can open and close the supply path 3. When the valve 4 is opened, the fluid flows from the tank 2 to the supply destination 7 through the supply path 3. The valve system 1 may be applied, for example, to a hydrogen fuel supply system that has a hydrogen tank and supplies hydrogen fuel to a fuel cell.

The valve system 1 has a control unit 5 and a pressure sensor 6 that measures the internal pressure P of the tank 2. The control unit 5 is a computer system having at least one processor and at least one memory. The measurement signal from the pressure sensor 6 is input to the control unit 5. The control unit 5 also outputs control signals to control the operating state of the valve 4. The memory of the control unit 5 stores various programs and various data (including maps) for controlling the valve 4. The control unit 5 has a plurality of circuits 51. When the programs stored in the memory are executed by the processor, the corresponding circuits 51 carry out the control described below. For example, the control of fluid flow through valve 4 is one of the functions performed by the program being executed.

As shown in FIG. 1, the valve 4 has a valve member 11 and a driving device (actuator) that moves the valve member 11. The driving device has, for example, a stepper motor 12 and an output shaft 13. The stepper motor 12 includes a rotor and a stator. The output shaft 13 is assembled with the valve member 11. The output shaft 13 has male threads on its surface. The rotor of the stepper motor 12 has female threads. The male thread of the output shaft 13 is screwed with the female threads of the rotor of the stepper motor 12. Therefore, the output shaft 13 moves in the axial direction (up and down) due to the rotation of the rotor As the output shaft 13 moves up and down, the valve member 11 also moves up and down.

A rubber-like sealing member 14 is provided on the underside of the valve member 11. The sealing member 14 has an annular shape. When the valve member 11 is lowered by the stepper motor 12, the sealing member 14 is pressed against the seat 3a of the supply path 3 from above. This allows the valve member 11 to properly shut off the supply path 3 and seal the tank 2. The valve member 11 is then raised and the sealing member 14 is separated from the seat 3a, thereby bringing an upstream path 3b and a downstream path 3c into a continuous state. This allows fluid to flow from the tank 2 to the supply destination 7.

The controller 5 can rotate the stepper motor 12 in the forward or reverse direction by controlling the number of steps. By rotating the stepper motor 12 in the forward or reverse direction for a predetermined number of steps, the valve member 11 moves a predetermined distance (stroke amount) in the vertical direction (open/close direction). In other words, the stroke amount of the valve member 11 can be adjusted by controlling the number of steps.

A method of controlling the rate of change of the tank internal pressure will be described. The flow rate of the fluid flowing from the tank 2 to the supply destination 7 depends on the amount of change per hour (rate of change R) of the internal pressure P of the tank 2, which decreases with the opening of the valve 4. Control of the flow rate can therefore be achieved by controlling the rate of change R of the internal pressure P of the tank 2 to be the target rate of change $R_0$ as explained below. Of course, the following method can also be used when the control of the rate of change R of the internal pressure P of the tank 2 is itself the objective.

Figure 2:
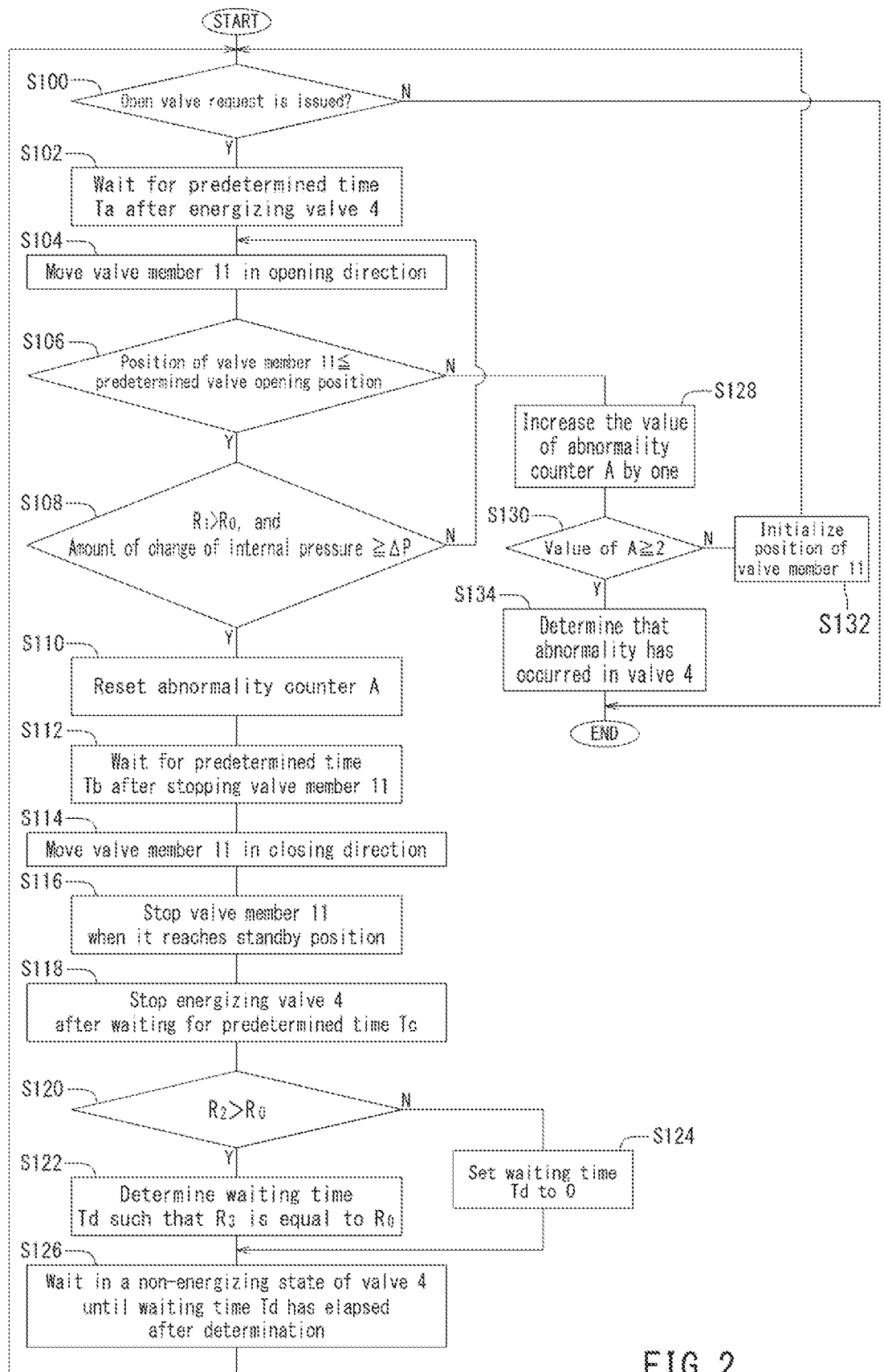
FIG. 2 is a flowchart showing the routine of the process for controlling the rate of change in tank pressure of the valve system of FIG. 1.
Figure 3:
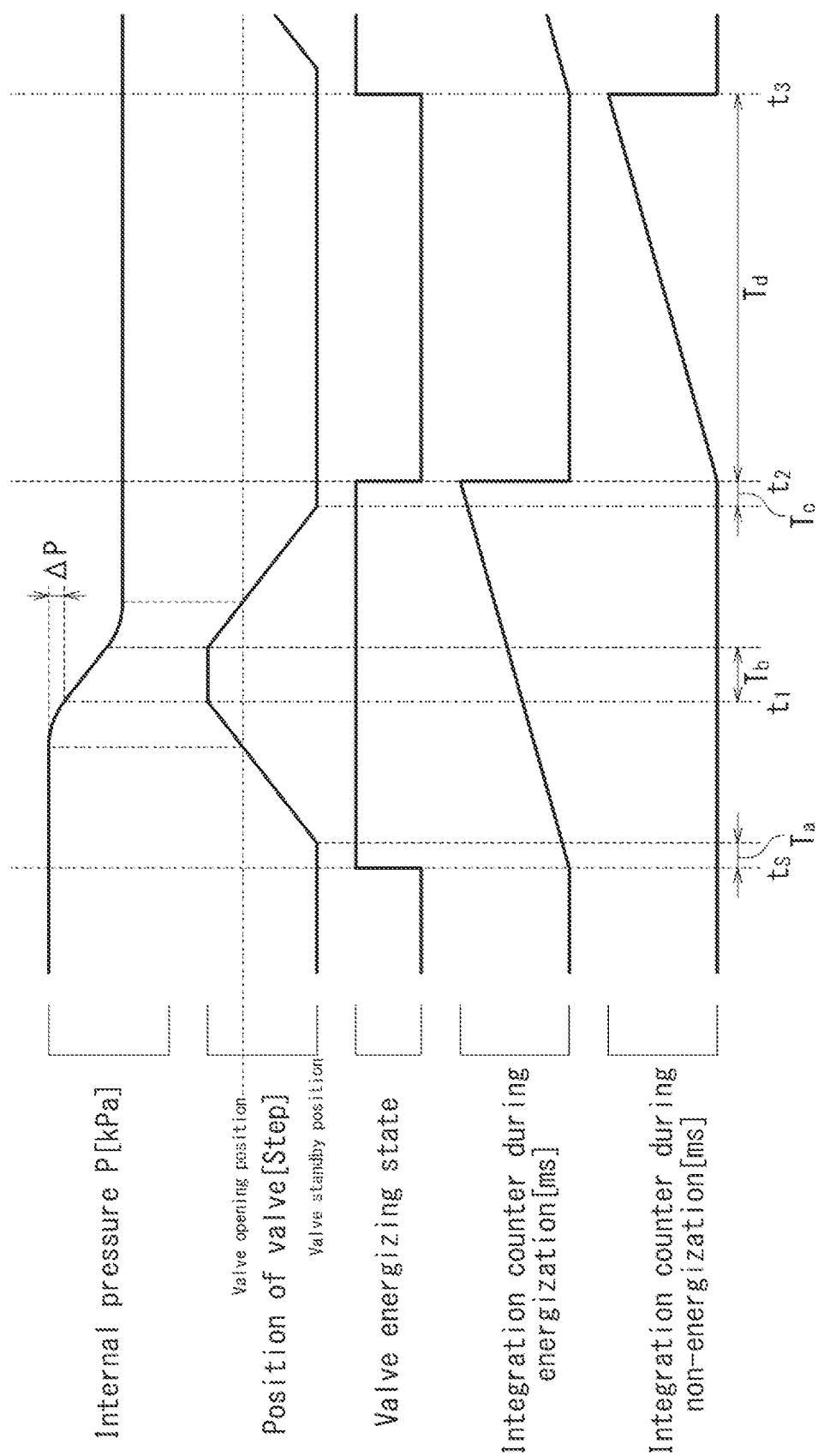
FIG. 3 is a time chart for the case where the rate of change in pressure $R_2$ up to the point after valve closure is greater than the target rate of change $R_0$.
Figure 4:
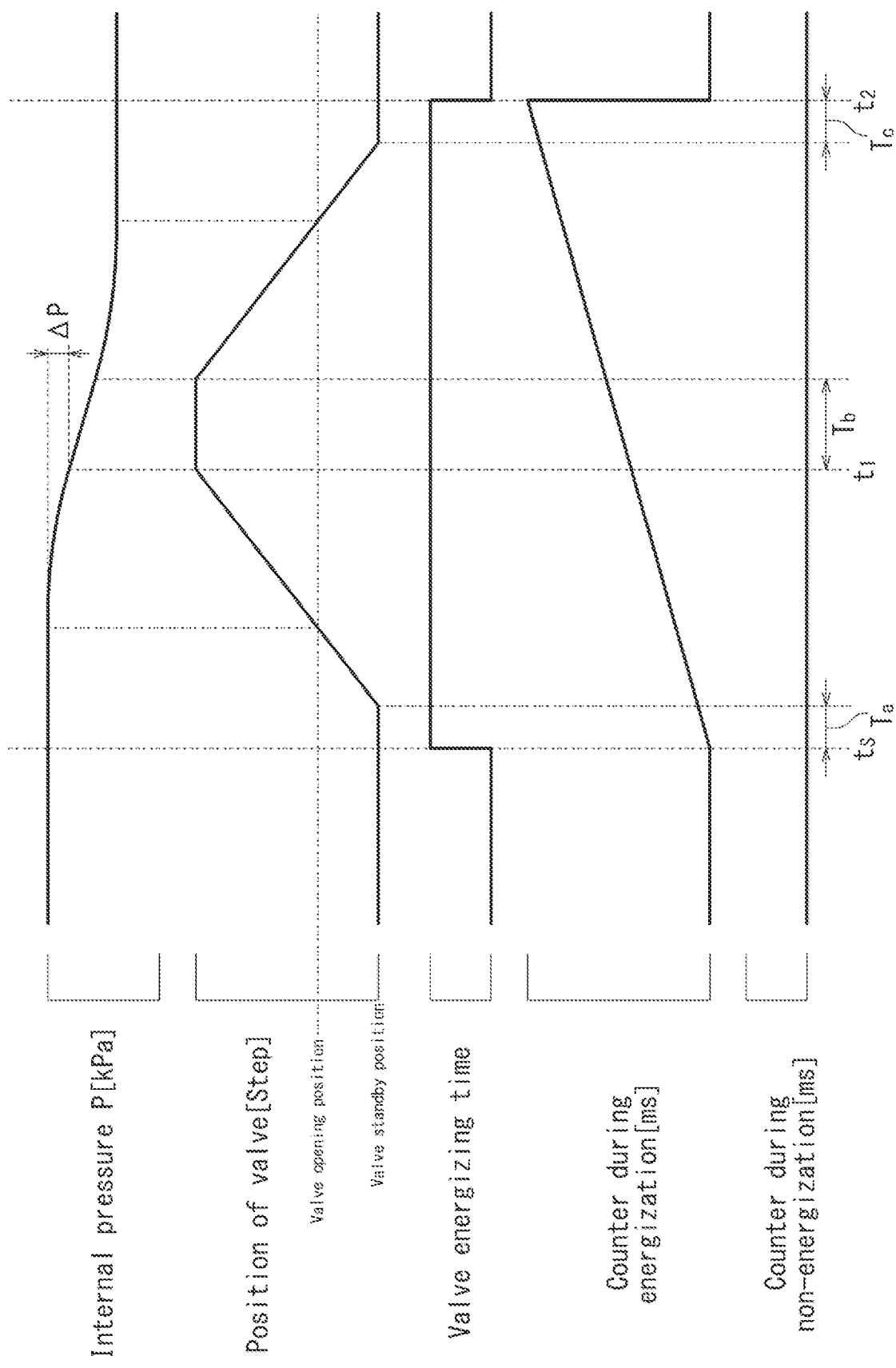
FIG. 4 is a time chart for the case where the rate of change $R_2$ is less than or equal to the target rate of change $R_0$.

FIG. 2 is a flowchart showing the routine of the process performed by the control unit 5 to control the rate of change R of the internal pressure P as one specific embodiment. FIGS. 3 and 4 are time charts each representing a control example. Each time chart represents, from the top, the internal pressure P of the tank 2, the number of steps of the stepper motor 12 (i.e., the position of valve member 11), the energized state of the stepper motor 12, the time count while the stepper motor 12 is energized, and the time count while not energized, respectively. The internal pressure P of the tank 2 is measured at regular intervals by the pressure sensor 6 and is recorded in the control unit 5.

One example of the control method will be described. Initially, the valve member 11 of the valve 4 is in the standby position, which has moved in the closing direction by a predetermined stroke amount from the opening position. First, it is determined whether a request to open the valve 4 has been issued (step S100). If the open valve request is not issued, this cycle is terminated. If the open valve request has been issued, the stepper motor 12 is energized (time ts). After energizing, the valve member 11 waits for a predetermined time Ta to prevent the stepper motor 12 from stalling (step S102). This can prevent the stepper motor 12 from stalling when the valve member 11 moves. While the stepper motor 12 is energized, a time count during energization is started.

Next, the valve member 11 is continuously moved in the opening direction at a constant opening speed (e.g., 20 ms/step) (step S104). Then, it is determined whether the position (number of steps) of the moved valve member 11 exceeds the predetermined position (number of steps), which is presumed to be well beyond the valve opening position (the valve member 11 is sufficiently separated from the seat 3a) even considering the dimensional tolerance of each component (step S106). If the valve member 11 has not exceeded the above predetermined position, it is determined whether the internal pressure P of the tank 2 from the start of energization (time ts) to the present time has decreased by the judgment standard pressure $\Delta P$ (e.g. 0.2 kPa) or more and whether the (average) rate of change $R_1$ of the internal pressure P from time ts to the present time exceeds the target rate of change $R_0$ (step S108).

If the internal pressure P has not decreased by more than the judgment standard pressure $\Delta P$, or if the rate of change $R_1$ of the internal pressure P does not exceed the target rate of change $R_0$ even though the internal pressure P has decreased by more than the judgment standard pressure $\Delta P$ (that is, N in step S108), the process returns to step S104 to continue moving the valve member 11 in the valve opening direction. If the internal pressure P has not decreased by more than the judgment standard pressure $\Delta P$, but the position of the valve member 11 exceeds the predetermined position mentioned above, which is presumed to have already opened sufficiently if the valve is normal (i.e., N in step S106), the value of the abnormality counter A, which counts the valve 4 abnormality, is increased by 1 (step S128). Then, it is determined whether the value of the abnormality counter A is 2 or more (step S130). If the abnormality counter A is 2 or more, it is determined that an abnormality has occurred in the valve 4 (step S134) and this cycle is terminated. If the abnormality counter A is 1, the position of the valve member 11 is moved to the position where the number of steps of the stepper motor 12 becomes 0 (step S132). The process then returns to step S100.

If it is detected that the internal pressure P has decreased by more than the judgment standard pressure $\Delta P$, and if the rate of change $R_1$ of the internal pressure P from time ts to the time of detection (time $t_1$) exceeds the target rate of change $R_0$, movement of the valve member 11 is stopped at that time. The judgment standard pressure $\Delta P$ can be set to a variable value proportional to the target rate of change $R_0$ of the internal pressure P (for example, 0.2 kPa, which is numerically equal to the target rate of change $R_0$ when $R_0$ is 0.2 kPa/s), but is not limited to this. For example, it can beset as a multiple (two times) of the resolution of the pressure sensor 6 (e.g., 0.1 kPa), or any other arbitrary value. The opening speed of the valve member 11 may be set to any desired speed.

Then, the value of the abnormality counter A is reset to 0 (step S110), and the valve member 11 is made to wait for a predetermined time b (e.g., 100 ms)(step S112). After the valve member 11 is made to wait for a predetermined time Tb, the valve member 11 is continuously moved in the closing direction at a constant closing speed (e.g., 20 ms/step) (step S114). Thus, by waiting for a predetermined time before reversing the valve member 11 from the open valve direction to the closed valve direction, the sudden change in the moving speed of the valve member 11 is suppressed. This can prevent the stepper motor 12 from stalling.

Next, when the valve member 11 reaches the standby position, movement of the valve member 11 is stopped and it was waited for a predetermined time Tc after the valve member 11 stops to prevent the stepper motor 12 from stalling (step S116). After the valve member 11 waits, the energizing of the stepper motor 12 is stopped (step S118).

Next, the elapsed time (energization duration) from the start of energization (time ts) to the stop of energization (time $t_2$) is measured, and the (average) rate of change $R_2$ of the internal pressure P from time ts to time $t_2$ is calculated. Then, the calculated rate of change $R_2$ is compared with the target rate of change $R_0$ (step S120). If $R_2 > R_0$, energization to the stepper motor 12 is stopped, as shown in FIG. 3. Then, as shown in FIG. 3, the stepper motor 12 waits in a de-energized state until the time $t_3$ when the stepper motor 12 is energized again (waiting time Td). The rate of change R of the internal pressure P can be adjusted by controlling the length of this waiting time Td. In other words, by providing the waiting time Td during which the internal pressure P does not change, the average rate of change R of the internal pressure P after the start of energization is reduced. The control unit 5 determines the waiting time Td so that the rate of change $R_3$ equals the target rate of change $R_0$ depending on the calculated rate of change $R_2$ of the internal pressure P up to time $t_2$ (step S122).

For example, if the energization duration is 1000 ms, the change in the internal pressure P is 0.4 kPa, and the target rate of change $R_0$ is 0.2 kPa/s, the waiting time Td is determined to be 1000 ms. This means that the (average) rate of change $R_3$ of the internal pressure P from time ts to time $t_3$ is calculated as below.

$$R_3 = 0.4 \text{ kPa}/(1000+1000)ms = 0.2 \text{ kPa}/s$$

The (average) rate of change $R_3$ becomes equal to the target rate of change $R_0$. Thus, the control unit 5 can adjust the rate of change R of the internal pressure P by adjusting the elapsed time using the waiting time Td (step S126). After adjusting the rate of change R, the process returns to step S100.

If $R_2 \le R_0$ in step S120, the waiting time Td is set to 0 and the process proceeds to step S126 (step S124), as shown in FIG. 4. In this case, since the waiting time Td is 0, the process returns to step S100 without waiting.

As another embodiment, in step S108, if the rate of change $R_1$ of the internal pressure P is less than the target rate of change $R_0$ when the amount of change in the internal pressure P reaches the judgment standard pressure ΔP, the valve member 11 may be stopped moving to continue the open valve state. At that time, the time count during energization may be reset and the rate of change R of the internal pressure P may be calculated by measuring the change in the internal pressure P from that point. In step S108, the process may proceed to step S110 when the amount of change in the internal pressure P decreases by mom than the judgment standard pressure ΔP, regardless of the rate of change $R_1$ in the internal pressure P.

To summarize the above description, the valve system 1 has the tank 2 capable of storing fluid, the pressure sensor 6 that detects the internal pressure P of the tank 2, the valve 4 that has the valve member 11 and opens and closes the tank 2, the driving device (stepper motor 12) to stroke the valve member 11 of the valve 4, and the control unit 5. The control unit 5 is configured to move the valve member 11 of the valve 4 in the opening direction after the cycle starts, reverse the direction of movement of the valve member 11 of the valve 4 to the standby position in the closed valve state, calculate the first pressure change rate $R_2$, which is the rate of change R of the internal pressure P since the cycle started, and determine the waiting time such that the second pressure change rate $R_3$, which is the rate of change R of the internal pressure P from the start of the cycle to the end of the cycle, is equal to the target rate of change $R_0$ if the first pressure change rate $R_2$ is greater than the target change rate $R_0$, and keep the driving device (stepper motor 12) in the standby position until the determined waiting time has elapsed.

In accordance with this configuration, even if the internal pressure P of the tank 2 cannot be matched to the target rate of change $R_0$ by adjusting the opening amount of the valve 4, the average rate of change R of the internal pressure P can be matched to the target rate of change $R_0$ by adjusting the waiting time in the closed valve state for each cycle. This enables accurate control of the valve system 1.

The control unit 5 is configured to reverse the direction of movement of the valve member 11 of the valve 4 when the pressure sensor 6 detects that the internal pressure P of the tank 2 has decreased by a certain value. This configuration allows the rate of change R of the internal pressure P to be controlled more precisely by ensuring a sufficient amount of change in the internal pressure P.

The control unit 5 is configured to set the waiting time to 0 when the first pressure change rate $R_2$ is equal to or less than the target change rate $R_0$. This configuration allows the process to proceed in a responsive manner.

If the control unit 5 calculates the third pressure change rate $R_1$, which is the rate of change R of the internal pressure P since the cycle started before reversing the direction of movement after moving the valve member 11 of valve 4 in the open valve direction, and keeps the valve open state without reversing the direction of movement of the valve 4 if the third pressure change rate $R_1$ is equal to or less than the target change rate $R_0$. This configuration allows the direction of movement of valve 4 not to be reversed in vain when the rate of change R of the internal pressure P is small.

The energization of the driving device (stepper motor 12) is started at the beginning of a cycle and is ended at the beginning of the waiting time, and the rate of change R is calculated based on the energization time of the driving device unit (stepper motor 12). This configuration makes it easy to manage the time when calculating the rate of change R by using the energizing or de-energizing of the highly responsive driving device (stepper motor 12) as the standard.

The driving device is composed of the stepper motor 12. This configuration improves the accuracy of control even when the stepper motor 12, which generally requires a waiting time to prevent stalling, is used as the driving device. In addition, manufacturing costs and power consumption can be reduced compared to the same control using a solenoid valve.

The valve system 1 described above can be applied to a hydrogen fuel supply system as well as, for example, an evaporative fuel treatment system with a fuel tank to store fuel and a canister to adsorb fuel vapor that evaporates from the fuel tank. The valve system can be widely applied to any other system with a tank for storing fluid and a valve for opening and closing the tank.

As another embodiment, the start of the cycle and the start of the waiting time do not necessarily have to coincide with the start or end of energization, but may be set arbitrarily. The time for calculating the rate of pressure change can also be set independently of the energization time.

In the above embodiment, the rate of change $R_1$ of the internal pressure P until the decrease in the judgment reference pressure ΔP is detected was used to determine whether the valve 4 should be reversed in the closed valve direction. But as another embodiment, for example, the rate of change R of the internal pressure P until any other appropriate point in time, such as when a certain time has passed from the start of energization or the start of the valve member 11 movement, may also be used.

As another embodiment, the driving device may be a linear solenoid, a DC motor system, etc., in addition to a stepper motor. Other devices that can electrically drive the valve member may be used.

Allfeaturesdisclosedinthedescriptionand/ortheclaimsareintendedtobedisclosedasinfonrational, instructive and/or representative and may thus be construed separately and independently from each other. In addition, all value ranges and/or indications of groups of entities are also intended to include possible intermediate values and/or intermediate entities for the purpose of original written disclosure, as well as for the purpose of restricting the claimed subject matter.

What is claimed is:

1. A valve system, comprising:
   a tank configured to store fluid,
   a pressure sensor configured to detect an internal pressure of the tank;
   a valve including a valve member and configured to open and close the tank;
   a driving device configured to move the valve member; and a control unit including at least one circuit, wherein the at least one circuit is configured to:
  move the valve member in a valve open direction after beginning of a cycle;
  reverse a direction of movement of the valve member and move the valve member to a standby position in a valve closed state;
  calculate a first rate of pressure change, which is a rate of change in the internal pressure since the cycle began;
  determine a waiting time such that a second rate of pressure change, which is a rate of change of the internal pressure from a start to an end of the cycle, is equal to a target rate of change if the first rate of pressure change is greater than the target rate of change, and
  keep the driving device in the standby position until the determined waiting time has elapsed.

2. The valve system of claim 1, wherein the control unit is configured to reverse the direction of movement of the valve member when the pressure sensor detects that the internal pressure of the tank has decreased by a certain value.

3. The valve system of claim 1, wherein the control unit is configured to set the waiting time to 0 when the first rate of pressure change is less than or equal to the target rate of change.

4. The valve system of claim 1, wherein the control unit is configured to:
  calculate a third rate of pressure change, which is a rate of change of the internal pressure since the cycle started, after the valve member is moved in the valve open direction and before the direction of movement is reversed, and
  keep the valve in an open state without reversing the direction of movement of the valve member if the third rate of pressure change is less than or equal to the target rate of change.

5. The valve system of claim 1, wherein the control unit is configured to starts energizing the driving device at beginning of the cycle, end energizing at beginning of the waiting time, and calculate the rate of change based on an energization time of the driving device.

6. The valve system of claim 1, wherein the driving device includes a stepper motor.

* * * * *